Aug. 22, 1967 P. B. MORGAN ET AL 3,337,874
TRAINING WEAPON RECORDING DEVICE OR TELLTALE
Filed Oct. 22, 1965 5 Sheets-Sheet 1

Paul B. Morgan
Lawrence E. Burkhardt
INVENTORS

BY

ATTORNEY

AGENT.

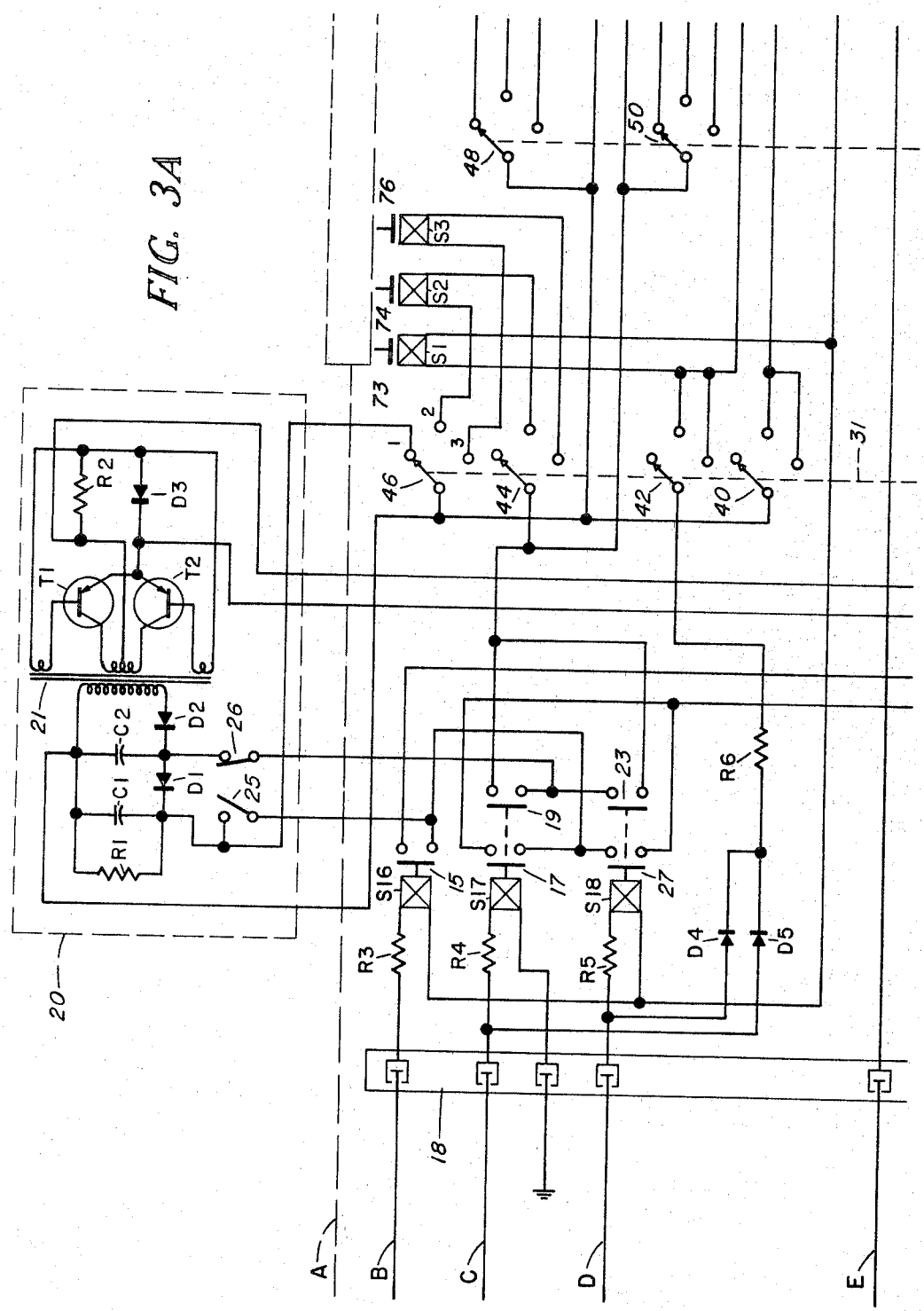

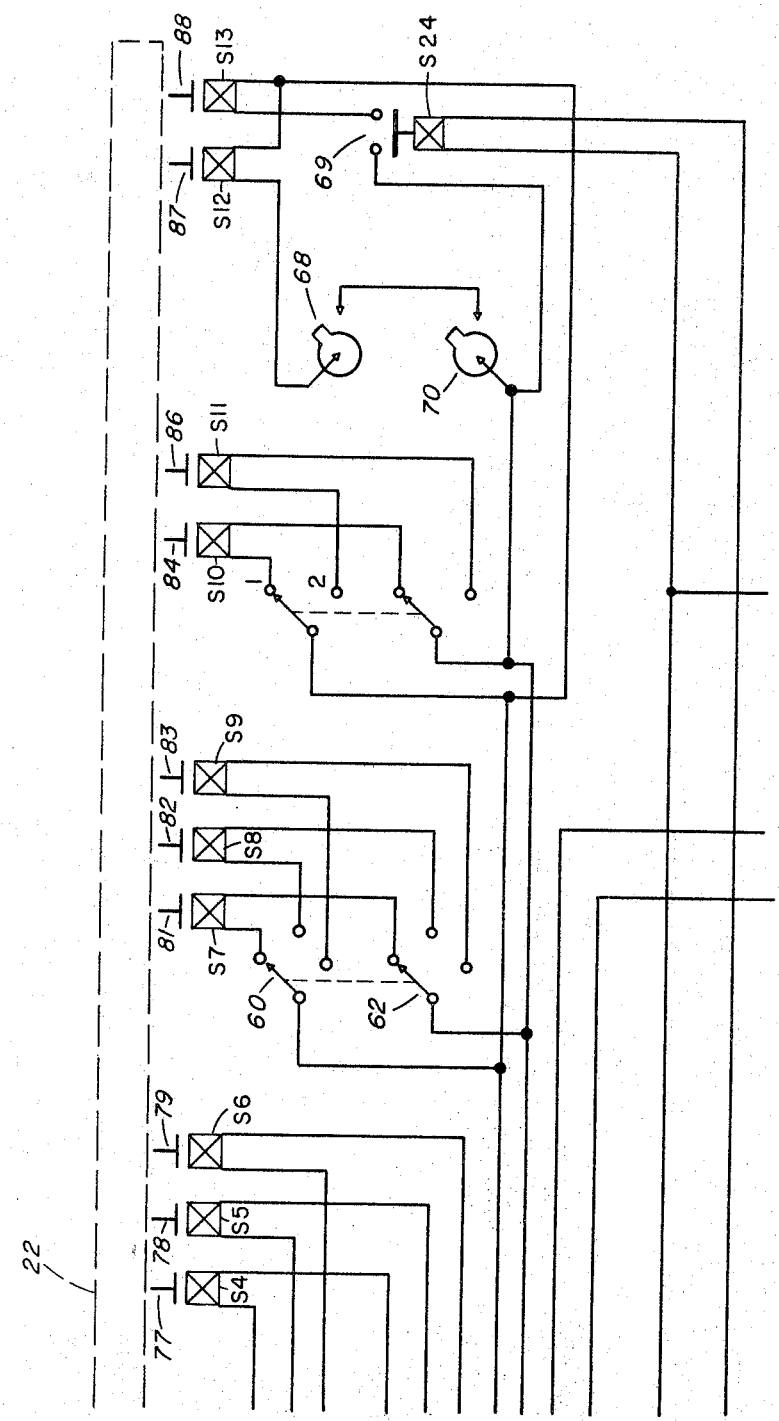

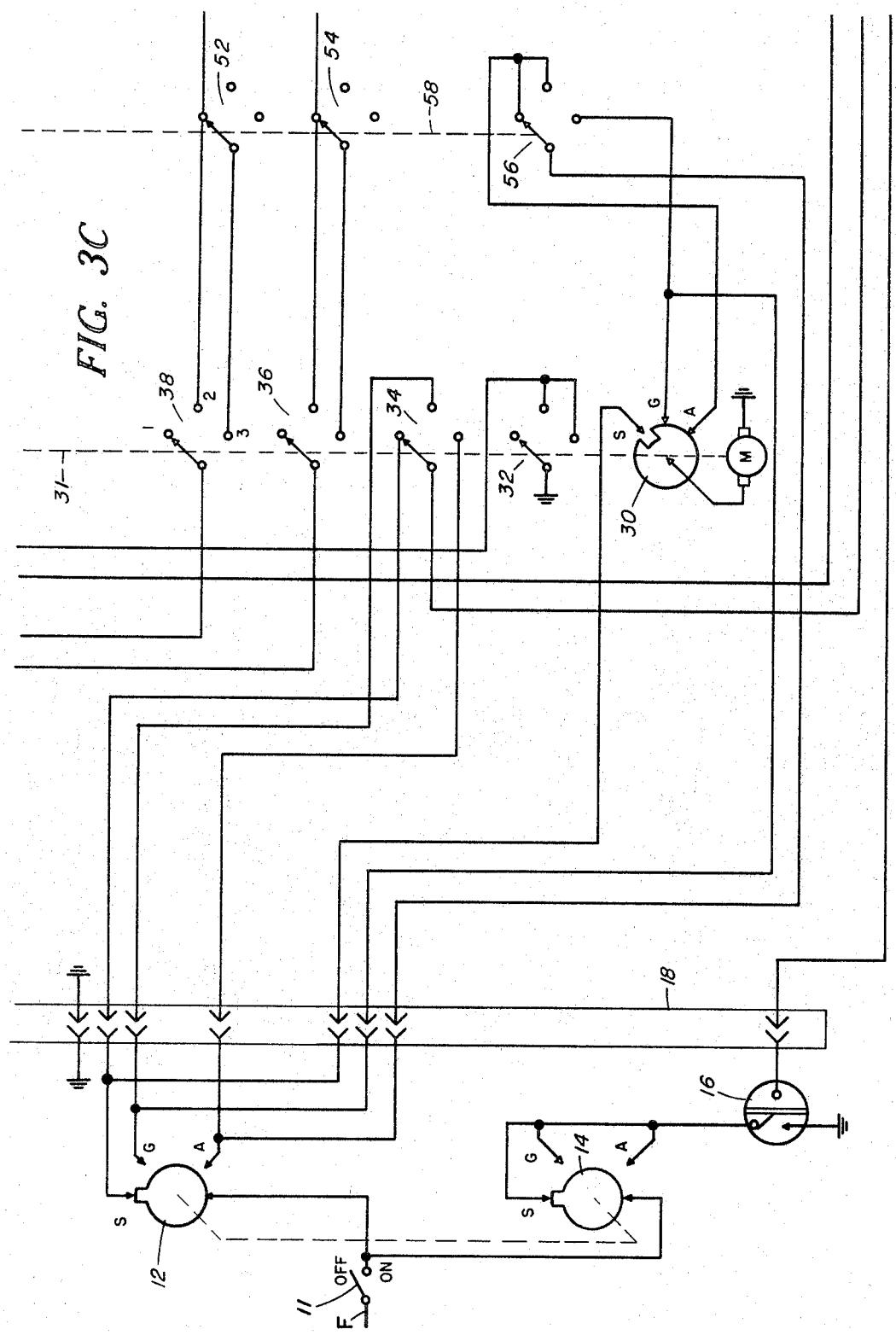

United States Patent Office 3,337,874
Patented Aug. 22, 1967

3,337,874
TRAINING WEAPON RECORDING DEVICE OR TELLTALE
Paul B. Morgan, Adelphi, and Lawrence E. Burkhardt, Burtonsville, Md., assignors to the United States of America as represented by the Secretary of the Navy
Filed Oct. 22, 1965, Ser. No. 502,724
6 Claims. (Cl. 346—38)

ABSTRACT OF THE DISCLOSURE

A training weapon recording device which records pre-flight and in-flight training procedures. The entire recorder is concealed in a training bomb and has a plurality of scoring elements preassigned through electrical switching connections to manual and automatic controls.

---

The invention described herein may be manufactured and used by or for the Government of the United States of America for governmental purposes without the payment of any royalties thereon or therefor.

This invention relates to training weapons, and more particularly to a method and apparatus for recording pre-flight and in-flight training procedures successfully performed on a training weapon simulating an actual weapon. A recorder predisposed in the training weapon automatically records pre-flight and in-flight weapon preparatory operations on a record strip which remains with the aircraft after releasing the weapon for later interpretation and evaluation by a training instructor.

In general, training exercises dealing with air-dropped stores require the same pre-flight preparations and in-flight operations up to the point of bomb release that would be required on an actual mission. Pre-flight preparations such as selection of weapon characteristic, and/or fuze option, or proper cable and bail attachment are primarily loading crew responsibilties; while certain in-flight operations such as arming the weapon and selecting the proper option are solely pilot functions.

In military operations it is extremely important that trained personnel be made available as soon as they are satisfactorily trained, but inadequate or incomplete training can be disastrous. To ascertain whether a crew and/or the pilot are satisfactorily trained to perform a mission without loss or unnecessary waste of expensive weaponry, a reliable training and evaluation method is necessary. Heretofore, there was no reliable method of determining accurately and timely at what point personnel were sufficiently or adequately trained or, if they were making errors in training exercises, in what specific procedures they were making errors or who was making them. Evaluations were for the most part made by referees witnessing the pre-flight procedures, and observing the operation of the training weapon after release. The presence of referee's checking of the various preparatory steps inherently introduces what can amount to a significant deviation from the procedure employed in preparation for an actual strike. If the weapon performed satisfactorily, it was assumed that all procedures have been executed correctly; if the weapon malfunctioned or provided other than intended behavior, only the referee evaluation and a later recovery of the weapon could be used in determining the possible source of the malfunction. Multipurpose tests performed on costly modified parent weapons are and have been used to evaluate both crew and pilot proficiency and hardware adequacy, but the cause of other than intended weapon behavior, either from malprocedures or hardware malfunction, can not necessarily be determined. Even at its best, training under these conditions was far from optimum.

The general purpose of this invention, therefore, is to provide a reliable weapon training evaluation method utilizing an automatic recording device concealed within or attachable to the weapon which will accurately and precisely reveal weapon preparation procedures which have or have not been performed prior to the release of the weapon from an aircraft. The concealed recording device requires (subsequent to manufacture of the trainer components such as cables and hull) only those preparatory steps required by the weapon being simulated (i.e. the "parent weapon"). Thus the trainer and the parent weapon have a one-to-one relationship in pre-flight and in-flight preparatory procedures.

An object is the provision of a method of evaluating training exercises accurately, precisely, and reliably immediately after the completion of an exercise or, for record purposes, at any suitable later time.

Another object is to provide a method of reviewing training weapon exercises for a weapon requiring a large plurality of certain pre-flight and in-flight procedures.

Still another object is to provide a method of evaluating the successful performance of a loading crew and a pilot in training exercises of a complex dummy weapon simulating a real weapon in size, weight, appearance, control locations and ballistics.

Yet another object is to provide a training evaluation apparatus which records precisely and automatically pre-flight and in-flight procedures performed during weapon preparation.

Still yet another object is to provide recording means in a training weapon, which records precisely operation procedures required by the weapon prior to release from an aircraft, which is concealed in the weapon during training exercises, which requires only the preparatory steps being required by the parent weapon, and which makes a record of the procedure performance which remains with the aircraft after weapon release.

A further object still is the provision of an automatic electrical recording device installable in a training weapon, which is constructed to be concealed during training exercises, which records loading crew procedures prior to flight and pilot procedures during flight on record means which is separable from the weapon by release of the weapon.

Another further object is to allow costly modified parent weapon trainers to be used solely for hardware evaluation by providing a cheaper, more adequate training weapon for meeting training and performance evaluation requirements, which enables a greater number of pilots to gain extensive training experience in weapon delivery.

Other objects and features of the invention will become apparent to those skilled in the art as the disclosure is made in the following description of the invention as illustrated in the accompanying sheets of drawings in which:

FIGS. 3a, 3b, 3c and 3d illustrate one embodiment of a recorder designed for a specific training weapon.

Figure 1:
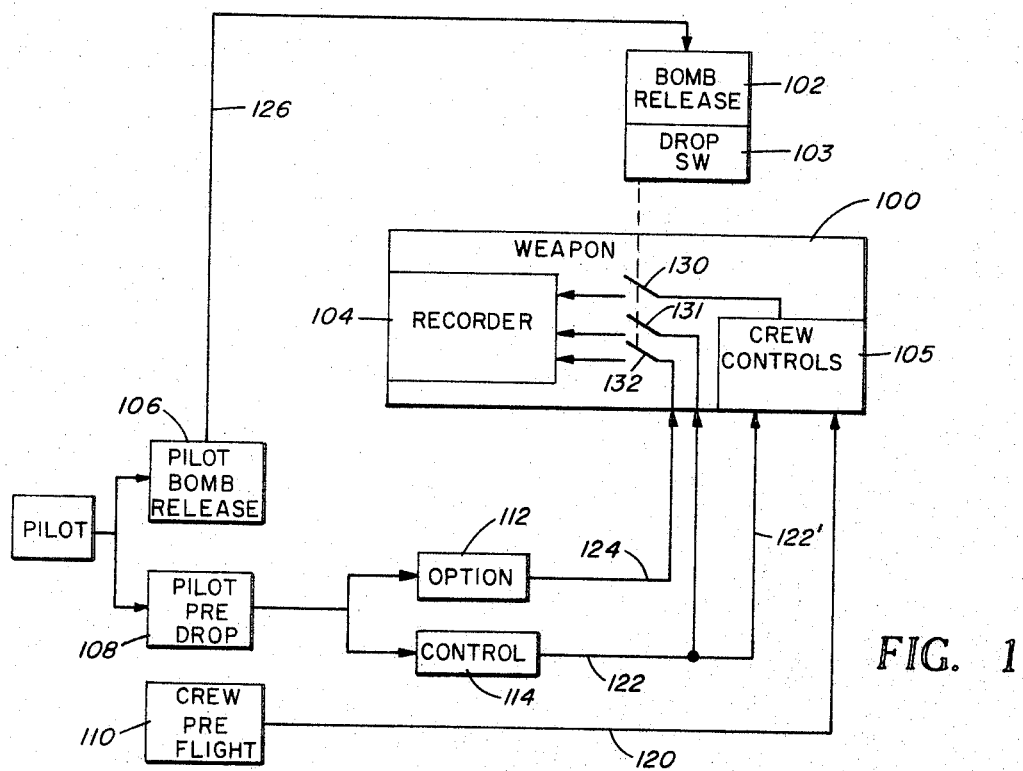
FIG. 1 illustrates the man-machine training system of the present invention.

Referring now to the drawings, FIG. 1 illustrates a training weapon recording system weapon wherein a recorder 104 is electrically connected within a training weapon 100. The weapon has several controls 105 preassigned to a loading crew for pre-flight settings and controls 112 and 114 assigned to the pilot during pre-drop operations. The crew prior to flight perform or do not perform certain procedures which are registered in the weapon for later recording when drop switch 103 is actuated. The pilot at position 108, while the weapon is in flight and during pre-drop, controls option switches 112 and control switches 114 which provide aircraft power to the weapon and information to the recorder at or during release. At the appropriate time the pilot operates the drop switch for bomb release 102 closing switches 130, 131 and 132 whereby the registered information is permanently recorded at or during the bomb release.

Weapon 100 is manufactured as an exact duplicate in weight, size and appearance and ballistic characteristics as the parent weapon with the only differences being internal and unnoticable (except identification as a trainer), to allow the one-to-one relationship in preparatory procedures between the trainer and parent weapon. The recorder 104 is designed to fit into the weapon itself or in a connecting cable which will be connected to the weapon as part of the crew pre-flight procedures. In any event the recorder is not detectable during training exercises and the weapon appears to be an exact duplicate of the parent weapon (except for identification as a trainer).

In setting up a training evaluation for training weapon exercise all the steps, both pre-flight and in-flight prior to the bomb release, must first be determined before particular storage spaces on the recording device are reserved for specific procedures. Appropriate electrical connections are then made between the manual controls and printing means within the recorder. Performance or non-performance of each procedure is then registered so that upon operation of the drop switch at or during weapon release an appropriate permanent record store is made.

In weapons systems the possible sources of error are the loading crew, the pilot, the pilot and loading crew together, or malfunction of the weapon apart from the human element. The system of FIG. 1 illustrates the manual input to a bomb suitable for being carried on an aircraft and also shows a recorder housed within the weapon. The crew 110 makes certain preflight procedures 120 which require specific manipulations on the control panels 105 on the exterior of the weapon. After the aircraft is in flight the pilot has certain pre-drop operations 108 to make before releasing the bomb. Before the weapon is armed, certain control operations 114 should be made. They may be of the nature of reversing any or all procedures up to this point over lead 122 or of a further preparatory nature of option in preparing the weapon over lead 124. When procedures 120, 122 and 124 have been done the weapon is ready for the pilot to release it. Pilot position 106 signals weapon release 102 which operates drop switch 103. When drop switch 103 is operated, switches 131 and 132 internal to the weapon close, permitting scoring to be made on a record in recorder 104.

Simultaneously, bomb release 102 releases weapon 100 from the aircraft. Should the pilot decide not to release the bomb but to place it in a safe position the weapon will be returned with the aircraft. Power may be supplied to the recorder in any appropriate manner such as the aircraft power supply or a power supply contained within the recorder or trainer.

Figure 2:
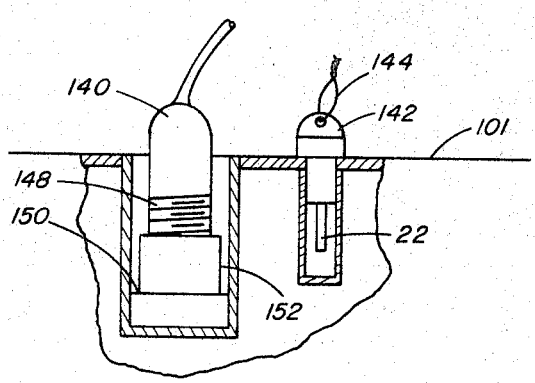
FIG. 2 illustrates one way of connecting the recorder and record to the training weapon.
Figure 4:
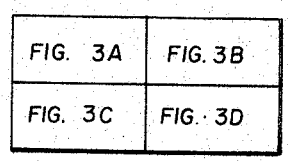
FIG. 4 illustrates the arrangement of FIGURES 3 (a–d) in one specific embodiment of the present invention.

FIG. 2 illustrates one way in which the recorder may be housed in the section 101 of the training weapon. This section is where the aircraft power weapon umbilical and pull-up switch are normally located on an actual weapon. Connector 140 provides power from the aircraft to the weapon and pull-up switch 142 is connected by bail wire 144 to the aircraft. Connector 140 is attached on to member 152 at joint 148 as a normal procedure by the landing crew and bail wire 144 is connected to the aircraft as another standard procedure made by the landing crew prior to flight. In this embodiment the recorder mechanism is housed in member 152. Upon release of the weapon 100 the connector and housing 152 will shear in the area 150 and switch actuator rod 142 will pull away from the weapon. Assuming the connector 140 and bail wire 144 have been properly attached the recorder and record device 152 will remain with the aircraft. Obviously however, the recorder and record could be attached to the weapon in several different ways than the specific manner in FIG. 2. For example, the recorder could be entirely housed in the switch actuator rod 142 and scoring could be made on the surface 22.

Figure 3D:
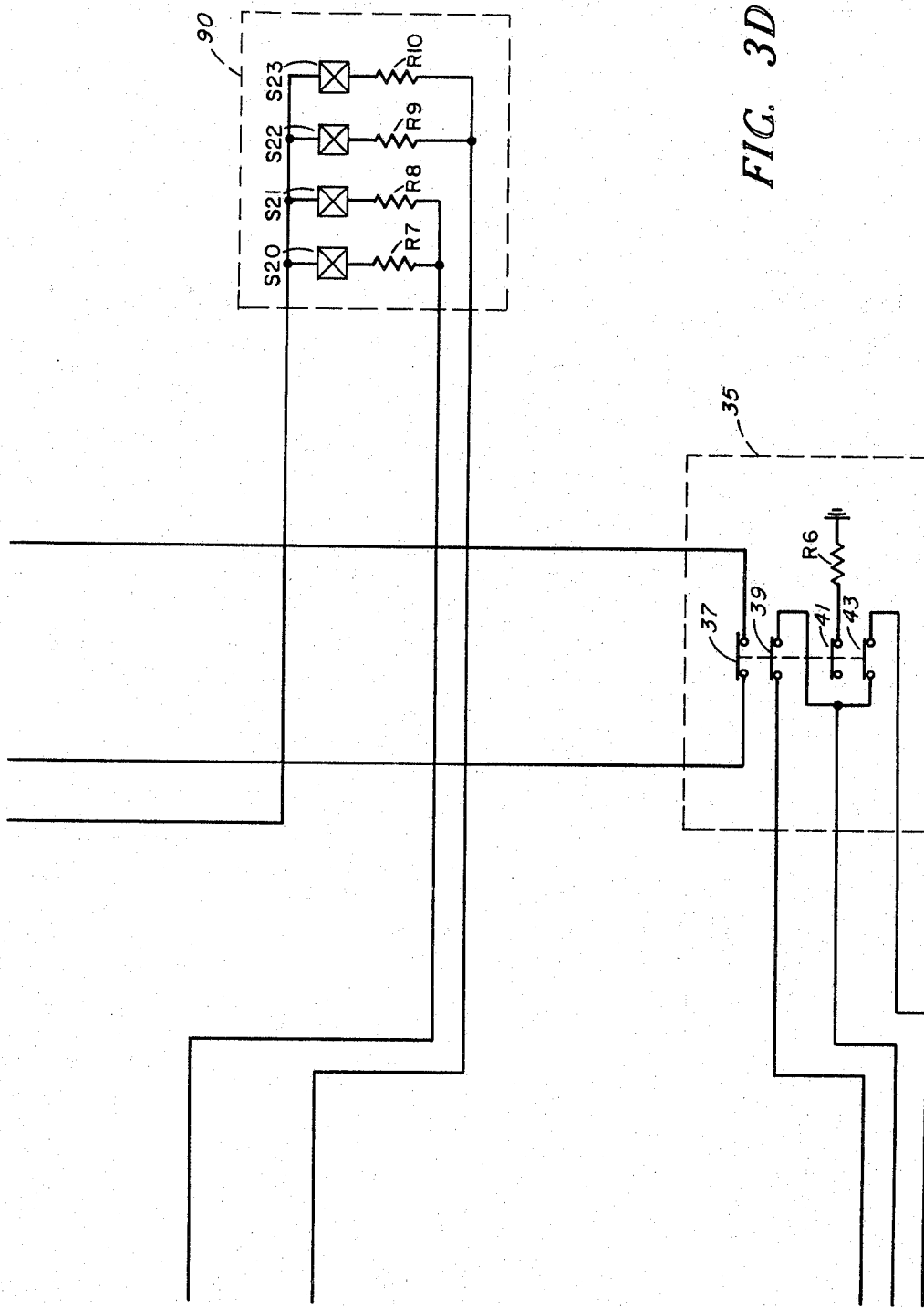

Referring now to FIGS. 3(a–d) for a better understanding of the invention, disclosure of one specific embodiment of the invention applied to a particular type of training weapon is made. When power switch 11 is moved from the OFF position to the ON position by the pilot, power is available through wire F from the aircraft through contact S of switch 12 and contact 1 of wiper switch 34 through plug 35. A similar signal is sent through switch 14 in the S position through monitor lamp 16 to plug 35. Monitor lamp 16 provides the pilot with a in-flight check on the plug 35 being inserted. If the plug is inserted as shown, switches 37, 39, 41 and 43 will be closed, providing an aircraft battery to ground connection through contacts 41 and 43 and resistor R6. Also with plug 35 inserted as shown and switch 11 in the ON position battery power is supplied over wire F through wiper contact 34, contact 39 to power supply 20.

Switches 12 and 14 ganged together are the pilot's arming controls. Initially the manual controls 12 and 14 and motor driven control cam 30 are in the safe positions S as shown. The pilot moves switches 14 and 12 to the G or A arming positions, depending on which fuze option is required. Switch 12 in either the G or A position completes a circuit through the G or A position respectively to ground through motor M moving the cam 30. When slot 20 rotates to the G or A position contact is broken and wipers 32 to 46 are stopped on either the second or third position respectively. Switch 14 in either the S, G or A position provides a constant monitor check, through the plug 35, on the agreement in position of the motor driven switch and the ganged switch 12 and 14.

Squibs S1 to S13 are used to record 13 bits of information on witness card 22. The squibs receive their firing impulse from capacitor storage and power supply 20. Transistorized power supply 20 has aircraft power supplied to the emitter electrodes of transistor DC to DC convertor T1 and T2 by way of switch 12, switch 34, and contact 39 in plug 35. Switch contacts 34 and 32 operate to connect aircraft power to power supply 20 only in positions 2 or 3 so that the pilot must first arm the weapon before any of the squibs S2 to S13 can be fired. S1 is fired directly by aircraft power through another route.

Resistor R2 is connected between diode D3 and ground through contacts 2 or 3 of switch 32. Transistors T1 and T2 provide an output to transformer 21, which is full wave rectified by diodes D1 and D2 and stored in capacitors C1 and C2. Resistor R1 is connected in shunt with capacitor C1 to provide an RC time constant for discharge of capacitors C1 and C2.

Aircraft-weapon interface 18 connects pilot controls directly to the trainer through pin connections but connects after-bomb-release control functions through multiple contacts on the drop switch to squibs S16, S17 and S18. None of the squibs S1 to S13 will be fired prior to bomb release. Only squib S1 will be fired if the pilot has made an arming option manuever and plug 35 has not been properly installed. Squib S1 is shorted by contact 37 when plug 35 has been correctly inserted. If plug 35 is not inserted and wiper 42 has moved into either number 2 or number 3 position contact 37 is open and a squib firing circuit is completed from aircraft leads C and D through diodes D4 and D5, resistor R6, wiper 42 and squib S1 back to ground. A scoring by marker 73 with no other positive scores indicates that plug 35 was not in and that a monitor check (either on deck or in flight) has not been performed or has been performed but improperly interpreted by the pilot.

A scoring with marker 74 or 76 indicates that the pilot armed the weapon, either option G with marker 74 or option A with marker 76. Squibs S2 and S3 receive their impulses from capacitors C1 and C2 when switches 44 and 46 are in positions 2 and 3, respectively, and when squibs S17 and S18 have closed contacts 19 and 23. If squibs S2 or S3 are fired the pilot armed the weapon, but if squib S1 also has been fired the pilot has inappropriately armed the weapon since plug 35 has not been inserted.

Movement of switch 58 is controlled by the loading crew and selects one of three weapon modes. Depending on the crew selection wiper contacts 48, 50, 52, 54 and 56 are moved to one of the three positions. Squibs S4, S5 and S6 fire markers 77, 78 and 79, respectively, when aircraft power is supplied through leads C and D and resistors R4 and R5 to squibs S17 and S18. Whether squib S4, S5 or S6 is fired depends on the setting of wipers 48 and 50 at positions 1, 2 or 3 respectively.

Wiper contacts 52 and 54 of switch 58 control function 90 which is necessary only to match characteristics of the parent weapon for appropriate modes. Movement of switch contacts 52 and 54 into positions 2 or 3 prevents a complete electrical circuit to squibs S20, S21, S22 and S23. When wiper contact 40 is in arm position 2 or 3, squib firing power is supplied from power supply 20 to function 90. Upon release of the bomb, drop switches in interface 18 close and aircraft power is connected through wire C to squib S17 through resistor R4 closing contacts 17 and 19. Aircraft power is supplied over lead D through resistor R5 to squib S18 closing contacts 27 and 23. With either contact 17 or contact 27 closed squibs S22 and S23 will be fired through R9 and R10, respectively. If additional squibs S20 and S21 should be fired power is supplied from lead B upon release of the bomb through resistor R3 to squib S16 closing contact 15. Upon closure of contact S15 with switch 38 in the 2 or 3 position and switch 52 in the position shown, squibs S20 and S21 fire through resistors R7 and R8 respectively.

Wiper contacts 60 and 62 indicate a second option control selectable prior to flight by the loading crew. Switch contacts 64 and 66 are also pre-flight selection controls and indicate still another pre-flight fuze option. Squib S10 will fire marker 84 when the setting is at the 1 position and squib S11 will fire marker 86 when the setting is on the 2 position.

Squib S24 closes contact 69 when aircraft power leads C and D are connected upon release of the bomb. The score of S12 with marker 87 provides information on the agreement in setting between switches 68 and 70, which is a pre-flight selection. The score of S13 with marker 88 indicates if an in-flight selection by the pilot was made of this option. If a crew has properly selected the setting on 68, setting's on contacts 68 and 70 will agree, firing S12. Squib S13 fires marker 88 when the proper selection of this option has been made either by the pilot or automatically.

Upon the firing or non-firing of squibs S1 to S13, at least thirteen bits of information will have been recorded on record or witness card 22. This card is attached to pull out switch A which is attached to the aircraft, so that upon release of the weapon the record remains attached to the aircraft for later evaluation. If the card is not retained, this indicates failure to attach the bail, providing a 14th bit of data.

The foregoing description is but one specific embodiment of the invention for a specific parent weapon.

Obviously, many other means of recording might have been used. For example, fuzible links burned or not burned to show the same information or recording bits of information by the use of magnetic bits induced in steel tape might readily have been used for the scoring device. Electronic logic in the switching circuitry could have been used in lieu of the mechanical switches and firing squibs. The information can be obtained at the time of weapon release as illustrated herein or may be provided at the time of commit arming in practice missions where the store is not to be expended. The recorder itself may or may not remain with the aircraft after separation but it is critical to retain the record by attaching it to any portion of the weapon system that remains with the aircraft after separation such as cables, pull-out connectors, bails, arming wires, etc.

With this invention it is possible to review training weapon exercises for a weapon requiring a plurality of pre-flight and in-flight procedures accurately, precisely and reliably by providing a permanent record of training exercises indicating the level of proficiency achieved by the loading crew and pilot in the readying and delivery of the weapon. The record remains with the aircraft after the weapon has been separated for interpretation and evaluation.

Various modifications are contemplated and may obviously be resorted to by those skilled in the art without departing from the spirit and the scope of the invention as hereinafter defined by the appended claims.

What is claimed and desired to be secured by Letters Patent of the United States is:

1. A recording device installable in a training weapon for recording training procedures in the preparation of a weapon for military missions comprising
   information input means including manual controls settable during pre-flight procedures,
   additional information input means including manual controls settable during in-flight procedures,
   information register means electrically connected to said information input means for temporarily storing said information,
   record means having predetermined positions corresponding to predetermined pre-flight and in-flight procedures physically connected to an attachment member of said weapon which will remain with said aircraft after release of said weapon, and
   impulse means connected to said information register means responsive to a signal indicating the end of said training exercise to read bits of information into said predetermined positions corresponding to said procedures.

2. The apparatus of claim 1 wherein said information register means are electromechanical switches having a plurality of wiper contacts and a plurality of stationary contacts.

3. The apparatus of claim 2 wherein said impulse means includes a plurality of squibs individually associated with predetermined ones of said procedure positions on said record means, each of said squibs connected between at least one of said stationary contacts and an energy source.

4. The apparatus of claim 3 wherein said impulse means includes a transistorized power supply housed within said weapon responsive to a weapon release signal for supplying firing signals to said squibs.

5. A recording apparatus installable in a training weapon to be carried in an aircraft comprising,
   a plurality of input leads connectable to pre-flight weapon controls and a plurality of input leads connectable to in-flight controls,
   electrical impulse supply means,
   a plurality of scoring elements contained in said training weapon,
   switch means connected between said impulse means, said impulse supply means and said scoring elements responsive to a predetermined control operation while the weapon is in flight for completing an electrical path between said power supply and said scoring elements,
   means for selecting predetermined ones of said scoring elements in accordance with the setting of said pre-flight and in-flight controls, record means having a recording surface physically attached to a member on said weapon which is to remain with said aircraft having a plurality of marking positions on said surface, said selected scoring elements marking corresponding positions on said surface when said predetermined control operation is performed.

6. The apparatus of claim 5 wherein all of said recording apparatus is contained within the connector of a power supply cable.

No references cited.

RICHARD B. WILKINSON, *Primary Examiner.*

S. J. TOMSKY, *Examiner.*

M. LORCH, *Assistant Examiner.*